March 14, 1967     H. A. COCCO     3,308,697
TOOL POST

Filed Nov. 18, 1964     3 Sheets-Sheet 1

INVENTOR.
HENRY A. COCCO
BY
Walter B. Udell
ATTORNEY

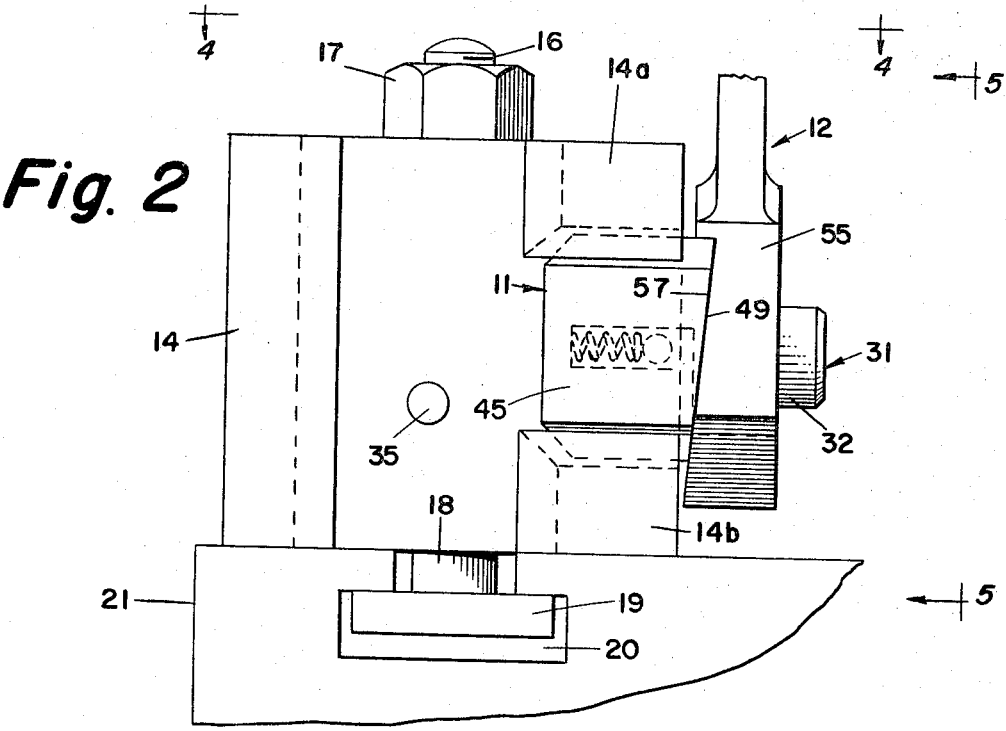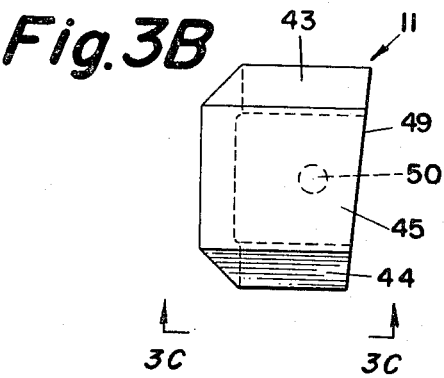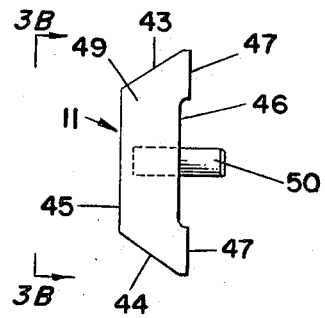

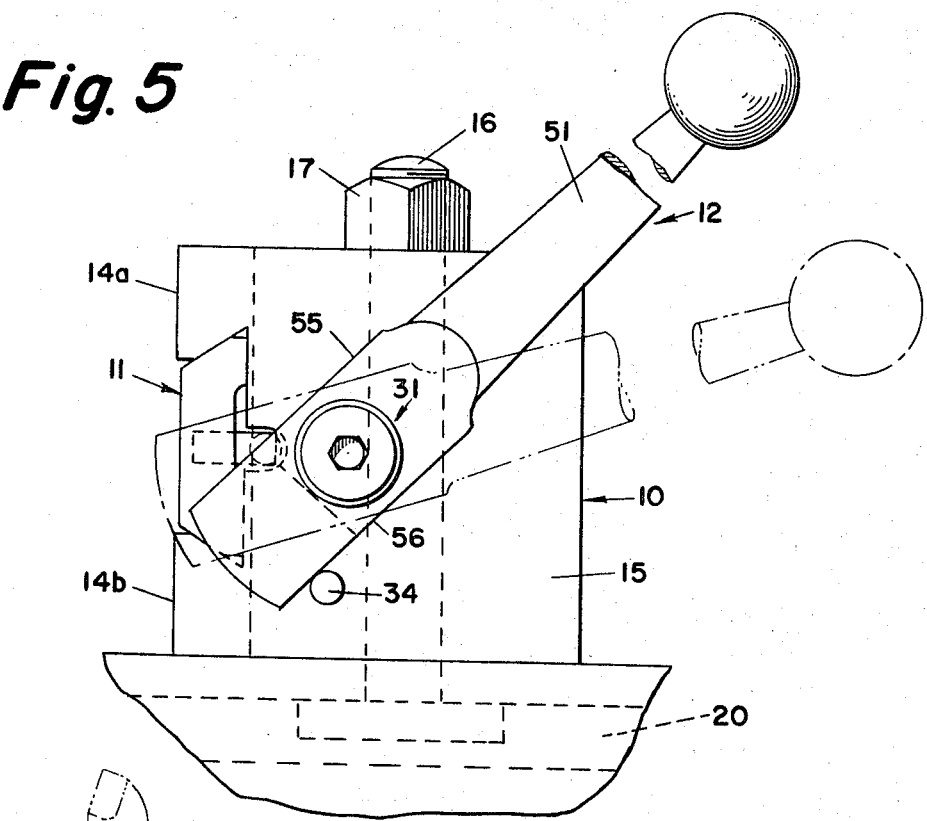
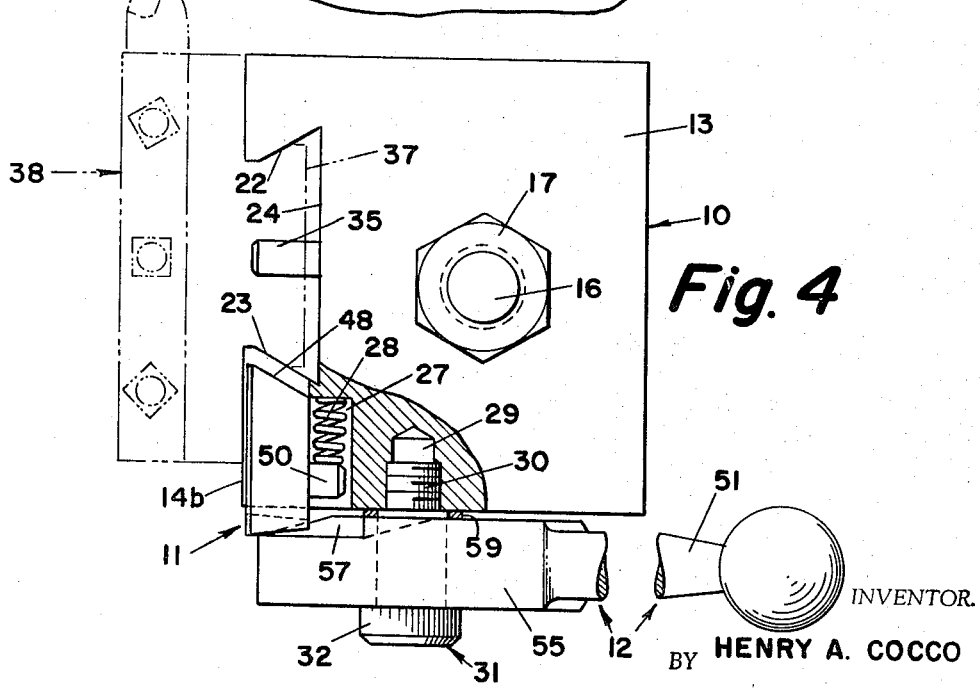

United States Patent Office 3,308,697
Patented Mar. 14, 1967

3,308,697
TOOL POST
Henry A. Cocco, 3005 Dogwood Lane,
Broomall, Pa. 19008
Filed Nov. 18, 1964, Ser. No. 412,176
12 Claims. (Cl. 82—36)

This invention relates generally to tool posts, and more particularly relates to a tool post for holding the different shaping, boring and cutting tools normally employed with lathe type machines.

Tool posts per se are of course very old and have taken many different forms, some of which are simple in construction and others of which are quite complicated. Regardless of the particular form taken by the known types of tool posts, all such devices have as a common object the provision of a rigid and immovable support for the working tools which it is desired to bring into engagement with the lathe held work.

It often occurs in the production of machined articles that during the course of manufacture it is necessary to carry out several different machining operations requiring the use of different cutting and shaping tools. Such operations can be carried out with rapidity when performed on a turret lathe because the necessary change of tooling is very quickly and easily accomplished. However, turret lathes are substantially more expensive than the usual lathe which includes provision for mounting only one machining tool at a time. In this latter case it is necessary for a change of machining that one tool be demounted from the tool post and be replaced by another. With simple tool posts this is a time consuming job because the newly installed tool must be properly indexed to the work before machining can be continued. This of course results in considerable non-productive downtime in any machining process where the tooling must be changed several times during the course of manufacture of an article.

In order to avoid this substantial downtime so that the costs of production may be decreased, many tool posts have been constructed with a view toward making the substitution of one tool for another a relatively simple and quickly accomplished procedure. Tool posts have in fact been constructed which achieve this purpose. However, such tool posts generally themselves require complicated machining and include a considerable number of working parts all of which results in a tool post which while operative for its intended purpose is nevertheless itself an item of considerable expense. The simpler types of tool posts usually suffer from constructional features which eventually cause wear in the parts of the tool post which interfere with the required precision operation desired. Accordingly, it is a primary object of my invention to provide a novel tool post adapted to be utilized with a plurality of individual substantially identical tool holders which enables tooling changes to be made extremely rapidly and with high precision of tool positioning.

Another object of my invention is to provide a novel tool post as aforesaid of extremely simple construction in which the various parts of the tool post are inexpensive and simple to manufacture.

A further object of my invention is to provide a novel tool post usable with standard tool holder structures which may be repetitively clamped into and removed from the tool post in such manner that the tool carried by the tool holder is always positionable at precisely the same setting.

A still further object of my invention is to provide a novel tool post in which a plurality of tool holders each carrying its own tool may be properly positioned in and locked to the tool post or released and removed from the tool post in a matter of seconds. The foregoing and other objects of my invention will become clear from a reading of the following specification in conjunction with an examination of the appended drawings, wherein:

FIGURE 1 is an exploded perspective view of the novel tool post according to the invention showing the several parts separated from one another and in some cases rotated to reveal structural features which would otherwise be concealed, a typical tool holder used with the novel tool post being also illustrated in a position of ninety degree rotation to that which it normally assumes when disposed in the tool post;

FIGURE 2 is an enlarged front elevation of the novel tool post according to the invention;

FIGURES 3A, 3B and 3C are respectively end, front and bottom plan views of the locking slider element of the tool post as would be seen when viewed along the lines 3A—3A, 3B—3B and 3C—3C of FIGURES 1, 3A and 3B respectively;

FIGURE 4 is a plan view of the novel tool post according to the invention as would be seen when viewed along the line 4—4 of FIGURE 2; and FIGURE 5 is an end elevation of the tool post according to the invention as would be seen when viewed along the line 5—5 of FIGURE 2.

In the several figures, like elements are denoted by like reference characters.

Figure 1:
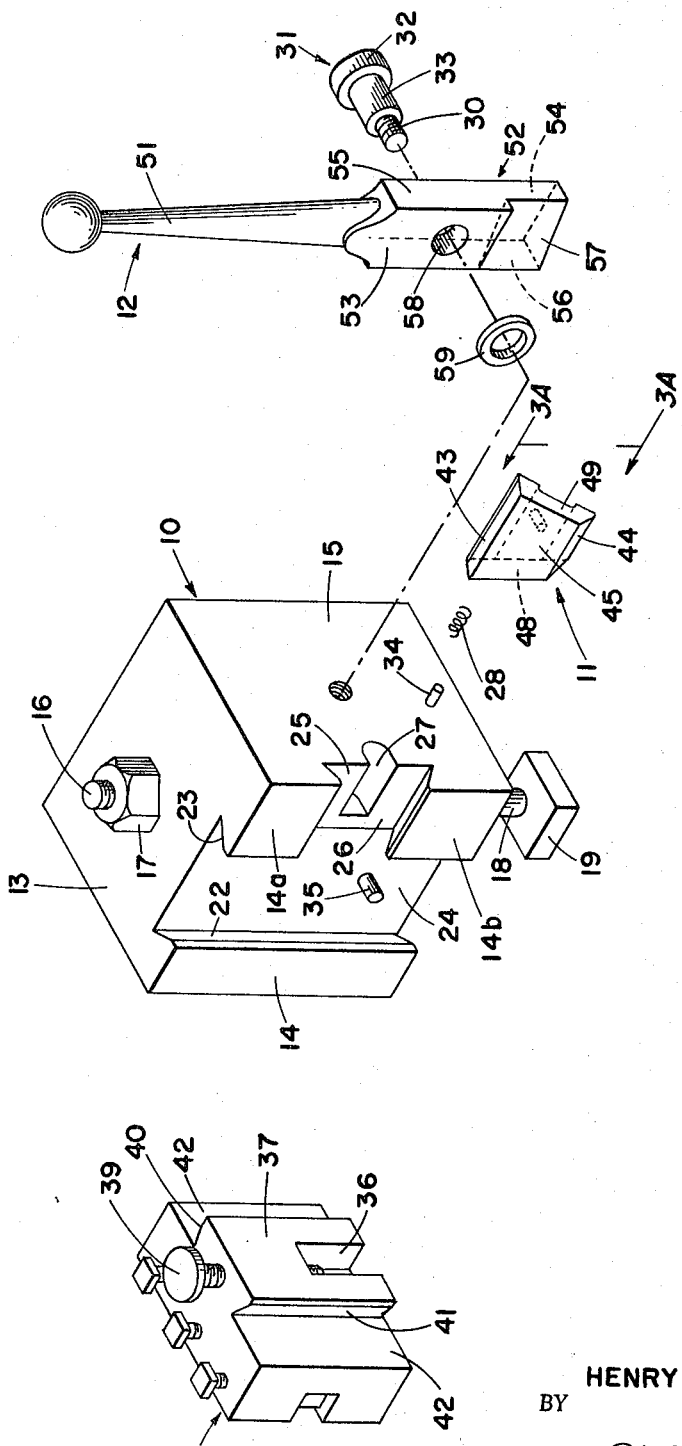

Briefly, the invention contemplates a tool post assembly of very simple construction requiring very little machining and using few parts which principally consist of a tool post block for accepting tool holders, a locking slide shiftable within a channel in the tool block, and a locking slide actuating operating handle effective to shift the slide toward a tool holder held by the tool post block to rigidly lock the holder to the block. The shifting movement of the locking slide is achieved by the provision of a camming surface on a slide face which presents toward and is in engagement with a complementally contoured cam surface on the operating handle so that rotation of the operating handle in one sense shifts the camming surfaces relatively to one another and drives the locking slide into locking engagement with the tool holder by overcoming the counter force of a biasing spring. Counter rotation of the operating handle permits the biasing spring to retract the locking slide from engagement with the tool holder and release the latter so that it may be quickly removed from the tool post block.

Referring now to the drawings, and firstly to FIGURES 1 through 3, the principal operating parts of the novel tool post according to the invention are seen to include the tool post block 10, locking slide 11 and operating handle 12. The tool post block 10 is a generally cubical metal block having a top surface 13, front face 14 and end face 15. The block 10 is vertically drilled completely therethrough from top to bottom so that a close fitting bolt 16 may be projected therethrough and secured on the top face by means of a nut 17. A portion of the bolt shank lower end 18 projects out of the tool post block 10 below the undersurface thereof and terminates in a threaded end which is threadedly engageable into a T-slot nut 19 adapted to be disposed within the T-slot 20 of a lathe compound rest 21, as best seen in the showing of FIGURE 2. The tool post block 10 is, in the usual manner, rigidly affixed to the compound rest by wrenching the nut 17 so that the bolt 18 is tightly drawn up to lock the block in a desired position.

The block 10 is machined vertically from top to bottom and through the front face 14 to provide a dovetail recess of generally equilateral trapezoidal shape in horizontal cross-section defined by side bounding surfaces 22 and 23 and a rear surface 24, which latter represents the longer base of the trapezoid and is parallel to the front face 14 of the block 10. Machined horizontally through the block 10 from the end face 15 completely through the dovetail recess side bounding surface 23 is the slide channel 25 also of generally equilateral trapezoidal shape in vertical cross-section with the smaller trapezoidal base parallel to and defining an opening through the front face of the block 10 to divide the latter into an upper front face region 14a and a lower front face region 14b. The slide channel rear wall 26 defined by the larger trapezoidal base is parallel to the tool post block front face areas and also to the dovetail recess rear wall 24 while being forwardly offset somewhat from the latter.

Machined inward from the end face 15 toward the dovetail recess side surface 23 and rearward from and cutting through the slide channel rear wall 26 is a slot 27 within which is disposed a compression coil spring 28 to provide the retracting bias for the locking slide 11 as will be seen more fully hereinafter. Drilled and tapped into the block 10 from the end face 15 is a threaded hole 29 for receiving the threaded end 30 of the operating handle securing shoulder stud 31. Between the threaded end 30 and the head 32 of shoulder stud 31 is the smooth cylindrical shank 33 which acts as a pivot for the operating handle 12. Set into the end face 15 of the tool post block 10 is a handle limit pin 34 which, as best seen in the showing of FIGURE 5, limits downward rotation of the working end of the operating handle 12 so that it never disengages from the working cam surface of the locking slide 11 to thereby avoid ejection of the locking slide from the tool post block under urging from the compression coil spring 28.

Set into the tool post block 10 and extending forward from the dovetail recess rear wall 24 is a stud 35 projectable into the stud slot 36 of the dovetail wedge 37 of tool holder 38. The stud 35 provides a stop for the lower end of the vertically adjustable tool holder height adjusting screw 39 threaded vertically downward through the tool holder dovetail wedge 37 and into the stud slot 36. By means of the adjusting screw 39 it will be understood that the vertical position of the tool holder 38 is selectively adjustable. As is perhaps best seen in the showings of FIGURES 1 and 4, the tool holder 38 is positioned in the tool post block 10 by vertically lowering the dovetail wedge 37 of the tool holder downward into the dovetail recess of the tool post block so that the angled faces 40 and 41 of the dovetail wedge 37 are opposed respectively to the dovetail recess side bounding surfaces 22 and 23 and are substantially surface engaged, the rear faces 42 of the tool holder 38 being flatwise disposed against the coplanar front faces 14, 14a and 14b of the tool post block 10. The surface clearances between the tool holder and tool post block are on the order of four thousandths of an inch so that while an easy sliding fit obtains there is substantially no wobble of the tool holder 38 within the tool post block 10.

The locking slide 11 is of substantially equilateral trapezoidal form in vertical cross section for a close sliding fit within the slide channel 25 of the tool post block 10, having upper and lower angle faces 43 and 44 respectively, a front face 45 corresponding to the smaller trapezoidal face, and a rear face parallel to the front face, the rear face being longitudinally recessed forward as at 46 to divide the same into upper and lower longitudinally extending coplanar slide surfaces 47 flatwise engageable with the slide channel rear wall 26. The slider depth between front and rear faces 45 and 47 is slightly less than the depth of slide channel 25 so that the slider front face 45 is disposed rearward of the tool post block upper and lower front faces 14a and 14b to prevent binding engagement with the tool holder rear face 42.

The left hand end face 48 is cut back at the same angle as is the dovetail recess side surface 23 of the tool post block 10 so that the end face 48 may be moved into coplanar relationship with the dovetail recess side surface 23 by longitudinal movement of the locking slide 11. This end face 48 is thus seen to be the clamping end face of the locking slide which is shiftable against the face 41 of the tool holder dovetail wedge 37 when the tool holder is disposed within the tool post block. The right hand end face of locking slide 11 designated as 49 is the camming end face engageable by the camming surface of the operating handle 12 and which lies in a plane perpendicular to the front and rear faces 45 and 47 of the slide 11 disposed typically at an angle of approximately five degrees from the vertical.

Rigidly affixed to and projecting rearward from the locking slide 11 is a slide bias pin 50 which projects into the slot 27 in the tool post block 10 with the side of the bias pin 50 disposed against the outer end of compression coil spring 28 in the manner most clearly seen in the showing of FIGURE 4. The pin 50 is so positioned relative to the length of the locking slide 11 and coil spring 28 that the spring 28 is always capable of retracting the locking slide 11 sufficiently to disengage the clamping end face 48 of the slide from any tool holder which might be disposed in the tool post block, while also avoiding bottoming of the turns of the spring 28 when the slide 11 is in its tool holder locking position.

The operating handle 12 includes an elongated lever section 51 joined at one end to the working end 52 formed in the general shape of a rectangular parallelepiped having parallel planar inner and outer side faces 53 and 54 respectively and upper and lower faces 55 and 56 respectively. The end region of the working end 52 is machined on the inner side face 53 between the upper and lower faces 55 and 56 to provide a planar camming surface 57 which intercepts the plane of the inner face 53 at the lower face 56 and is divergent from the inner face 53 at the upper face 55 so that in effect the upper face 55 is resected back for a distance from the inner face 53 toward the outer side face 54. The angle of the plane of the camming surface 57 with respect to the plane of the inner side face 53 is the same as that of the camming end face 49 of locking slide 11, and in the illustrated case is approximately five degrees.

Extending through the working end 52 orthogonally to and through the inner and outer side faces 53 and 54 is a pivot bore 58 of proper diameter to permit free relatively close fitting smooth passage therethrough of the shank 33 of the shoulder stud 31. The shank 33 of shoulder stud 31 projects sufficiently through and beyond pivot bore 58 of operating handle 12 so that the shim washer 59 may also be disposed thereon to space the inner side face 53 of the operating handle outward of contact with the end face 15 of the tool post block.

With the shoulder stud projected through the operating handle and with the washer 59 disposed thereupon, assembly of the tool post is simply effected by placing the compression coil spring 28 in the slot 27 of the block 10, projecting the locking slide 11 into slide channel 25 with the slide bias pin 50 engaged against the end of compression spring 28, engaging the camming surface 57 of the operating handle against the locking slide cam surface 49 with the lower face 56 of the operating handle above the handle limit pin 34, and then projecting the threaded end 30 of shoulder stud 31 into the tapped hole 29 in the tool post block 10 and tightening the shoulder stud.

With the unit assembled as shown in FIGURES 2, 4 and 5, it is observed from FIGURE 5 that limit pin 34 prevents rotation of the handle 12 beyond the solid line positional showing so that it is clear that locking slide 11 is held captive in the tool post block 10 and cannot be ejected by action of the compression locking slide spring 28 because the camming locking slide end face 49 is engaged by the camming surface 57 of the operating handle 12. As will be best seen from FIGURES 2 and 4, downward rotation of the handle lever 51 causes the handle-carried camming surface 57 to rotate upward in sliding engagement against the locking slide camming surface 49 and cause the locking slide 11 to shift horizontally inward toward the dovetail recess. Typically, in the illustrated configuration a lateral shift of substantially fifty thousandths of an inch for the locking slide 11 is effected with camming surfaces at a five degree cam angle for a thirty degree rotation of the operating handle 12. Since, as previously described, clearances between the tool holder dovetail and the tool post dovetail recess would be typically on the order of four thousandths of an inch, smaller camming angles or operating handle angle of throw could be utilized if desired. However, the above mentioned typical values are practical for a mass production item.

Since the camming surface 57 of the operating handle is rotating rather than sliding rectilinearly upward, theoretically surface engagement between the camming surfaces 57 and 49 can only occur at one precise position. Consequently, the dimensional relationships are so chosen between the parts that locking engagement between the locking slide 11 and a tool holder disposed within the dovetail recess occurs with the operating handle in that position corresponding to surface engagement between the camming surfaces. In the illustrated case this would be when the locking handle 12 were in a horizontal position.

This theoretical consideration, as a practical matter, is not overly important since the angular range of operating handle throw, about the lock-up position, is relatively small, and, if desired, surface engagement of the camming surfaces throughout this small rotational range of the handle 12 is readily achieved by allowing for just the slightest amount of wobble of the handle 12 on the shoulder stud 31. In practice, it has not been found necessary to make any specific provision for this. The various parts of the apparatus, compression spring 28 excepted, would of course be made of hardenable steel to provide good wearing properties. It should be particularly noted that the operating handle 12 rotates about the smooth surface shank 33 of the shoulder stud 31 and that the shoulder stud does not itself rotate during operation of the device. Consequently no wear takes place whatever between the threads 30 of the shoulder stud 31 and the threads of tapered hole 29 in the tool post block.

From the foregoing it will be now appreciated that interchange of a number of tool holders carrying differing types of tools for effecting a sequence of different machining operations can be quickly and easily carried out with substantially no downtime whatever, release and removal of one tool holder followed by insertion and lock-up of a succeeding tool holder being readily accomplished in a matter of seconds.

Having now described my invention in connection with a particularly illustrated embodiment thereof, it will be appreciated that variations and modifications of my invention may now occur from time to time to those persons normally skilled in the art without departing from the essential scope or spirit thereof, and accordingly it is intended to claim the same broadly as well as specifically as indicated by the appended claims.

What is claimed as new and useful is:

1. For use with a tool holder having a mounting projection thereon extending laterally of a face of the tool holder, a tool post comprising in combination,
   (a) a tool post block having a recess formed therein opening through at least one face of the block, which recess is sized and shaped to close fittingly slidably receive thereinto the tool holder mounting projection with the face of the tool holder from which extends the mounting projection substantially slidably surface engageable with the said at least one face of the tool post block through which the recess opens, said tool post block also having formed therein a locking slide channel one end of which opens into the recess through a wall of the block which defines one side surface of the recess,
   (b) a locking slide in said tool post block close fittingly slidably disposed within the said locking slide channel for rectilinear movement therein, one end of said locking slide being proximate to and shiftable through the plane of the channel opening into the mounting projection receiving recess, said locking slide one end being shaped to surfacially conform to that area of the side surface of a tool holder mounting projection disposable within said recess which is in apposition to the said locking slide channel open end, the opposite end of said locking slide being provided with a planar cam face the plane of which is oriented transversely at an acute angle to the direction of rectilinear sliding movement of said locking slide,
   (c) an operating handle and pivot means pivotally securing said handle to said tool post block for rotation in a plane transverse to the line of movement of said locking slide, a planar cam face on said handle disposed against said locking slide cam face and slidable transversely thereacross in opposite directions when said handle is rotated in opposite directions to thereby respectively drive said locking slide toward said mounting projection receiving recess to lock a tool holder therein and permit retraction of said locking slide from said recess to release the tool holder and permit withdrawal thereof from the tool post block.

2. For use with a tool holder having a dovetail wedge thereon extending laterally of a face of the tool holder, a tool post comprising in combination,
   (a) a tool post block having a dovetail recess formed therein opening through at least one face of the block, which recess is sized and shaped to close fittingly slidably receive thereinto the tool holder dovetail wedge with the face of the tool holder from which extends the dovetail wedge substantially slidably surface engageable with the said at least one face of the tool post block through which the dovetail recess opens, said tool post block also having formed therein a locking slide channel one end of which opens into the dovetail recess through a wall of the block which defines one side surface of the recess,
   (b) a locking slide in said tool post block close fittingly slidably disposed within the said locking slide channel for rectilinear movement therein, one end of said locking slide being proximate to and shiftable through the plane of the channel opening into the dovetail recess, said locking slide one end being shaped to surfacially conform to that area of the side surface of a tool holder dovetail wedge disposable within said dovetail recess which is in apposition to the said locking slide channel open end, the opposite end of said locking slide being provided with a planar cam face the plane of which is oriented transversely at an acute angle to the direction of rectilinear sliding movement of said locking slide,
   (c) an operating handle and pivot means pivotally securing said handle to said tool post block for rotation in a plane transverse to the line of movement of said locking slide, a planar cam face on said handle disposed against said locking slide cam face and slidable transversely thereacross in opposite directions when said handle is rotated in opposite directions to thereby respectively drive said locking slide toward said dovetail recess to lock a tool holder therein and permit retraction of said locking slide from said dovetail recess to release the tool holder and permit withdrawal thereof from the tool post block 3. For use with a tool holder having a mounting projection thereon extending laterally of a face of the tool holder, a tool post comprising in combination,
   (a) a tool post block having a recess formed therein opening through at least one face of the block, which recess is sized and shaped to close fittingly slidably receive thereinto the tool holder mounting projection with the face of the tool holder from which extends the mounting projection substantially slidably surface engageable with the said at least one face of the tool post block through which the recess opens, said tool post block also having formed therein a locking slide channel one end of which opens into the recess through a wall of the block which defines one side surface of the recess, (b) a locking slide in said tool post block close fittingly slidably disposed within the said locking slide channel for rectilinear movement therein, one end of said locking slide being proximate to and shiftable through the plane of the channel opening into the mounting projection receiving recess, said locking slide one end being shaped to surfacially conform to that area of the side surface of a tool holder mounting projection disposable within said recess which is in apposition to the said locking slide channel open end, the opposite end of said locking slide being provided with a planar cam face the plane of which is oriented transversely at an acute angle to the direction of rectilinear sliding movement of said locking slide, (c) an operating handle and pivot means pivotally securing said handle to said tool post block for rotation in a plane transverse to the line of movement of said locking slide, a planar cam face on said handle disposed against said locking slide cam face and slidable transversely thereacross in opposite directions when said handle is rotated in opposite directions to thereby respectively drive said locking slide toward said mounting projection receiving recess to lock a tool holder therein and permit retraction of said locking slide from said recess to release the tool holder and permit withdrawal thereof from the tool post block, said locking slide and operating handle cam faces being so related that sufficient rectilinear shifting movement of said locking slide to effect complete lock and release of a tool holder is provided by rotation of said operating handle through an acute angle.

4. For use with a tool holder having a mounting projection thereon extending laterally of a face of the tool holder, a tool post comprising in cmbination, (a) a tool post block having a recess formed therein opening through at least one face of the block, which recess is sized and shaped to close fittingly slidably receive thereinto the tool holder mounting projection with the face of the tool holder from which extends the mounting projection substantially slidably surface engageable with the said at least one face of the tool post block through which the recess opens, said tool post block also having formed therein a locking slide channel one end of which opens into the recess through a wall of the block which defines one side surface of the recess, (b) a locking slide in said tool post block close fittingly slidably disposed within the said locking slide channel for rectilinear movement therein, one end of said locking slide being proximate to and shiftable through the plane of the channel opening into the mounting projection receiving recess, said locking slide one end being shaped to surfacially conform to that area of the side surface of a tool holder mounting projection disposable within said recess which is in apposition to the said locking slide channel open end, the opposite end of said locking slide being provided with a planar cam face the plane of which is oriented transversely at an acute angle to the direction of rectilinear sliding movement of said locking slide, (c) an operating handle and pivot means pivotally securing said handle to said tool post block for rotation in a plane transverse to the line of movement of said locking slide, said pivot means being rigidly fixed to said tool post block with said operating handle disposed thereon and swingable freely thereabout in a substantially fixed plane, a planar cam face on said handle disposed against said locking slide cam face and slidable transversely thereacross in opposite directions when said handle is rotated in opposite directions to thereby respectively drive said locking slide toward said mounting projection receiving recess to lock a tool holder therein and permit retraction of said locking slide from said recess to release the tool holder and permit withdrawal thereof from the tool post block.

5. For use with a tool holder having a mounting projection thereon extending laterally of a face of the tool holder, a tool post comprising in combination, (a) a tool post block having a recess formed therein opening through at least one face of the block, which recess is sized and shaped to close fittingly slidably receive thereinto the tool holder mounting projection with the face of the tool holder from which extends the mounting projection substantially slidably surface engageable with the said at least one face of the tool post block through which the recess opens, said tool post block also having formed therein a locking slide channel one end of which opens into the recess through a wall of the block which defines one side surface of the recess, (b) a locking slide in said tool post block close fittingly slidably disposed within the said locking slide channel for rectilinear movement therein, one end of said locking slide being proximate to and shiftable through the plane of the channel opening into the mounting projection receiving recess, said locking slide one end being shaped to surfacially conform to that area of the side surface of a tool holder mounting projection disposable within said recess which is in apposition to the said locking slide channel open end, the opposite end of said locking slide being provided with a planar cam face the plane of which is oriented transversely at an acute angle to the direction of rectilinear sliding movement of said locking slide, (c) an operating handle and pivot means pivotally securing said handle to said tool post block for rotation in a plane transverse to the line of movement of said locking slide, a planar cam face on said handle disposed against said locking slide cam face and slidable transversely thereacross in opposite directions when said handle is rotated in opposite directions to thereby respectively drive said locking slide toward said mounting projection receiving recess to lock a tool holder therein and permit retraction of said locking slide from said recess to release the tool holder and permit withdrawal thereof from the tool post block, and resilient biasing means engaged with said locking slide effective to constantly urge said locking slide within said slide channel away from said recess and toward said operating handle.

6. The tool post apparatus as set forth in claim 5 further including operating handle rotation stop means effective to limit rotation of said operating handle to prevent disengagement of said operating handle from said locking slide when said handle is rotated in tool holder releasing direction.

7. For use with a tool holder having a mounting projection thereon extending laterally of a face of the tool holder, a tool post comprising in combination, (a) a tool post block having a recess formed therein opening through at least one face of the block, which recess is sized and shaped to close fittingly slidably receive thereinto the tool holder mounting projection with the face of the tool holder from which extends the mounting projection substantially slidably surface engageable with the said at least one face of the tool post block through which the recess opens, said tool post block also having formed therein a locking slide channel one end of which opens into the recess through a wall of the block which defines one side surface of the recess,
- (b) a locking slide in said tool post block close fittingly slidably disposed within the said locking slide channel for rectilinear movement therein, one end of said locking slide being proximate to and shiftable through the plane of the channel opening into the mounting projection receiving recess, said locking slide one end being shaped to surfacially conform to that area of the side surface of a tool holder mounting projection disposable within said recess which is in apposition to the said locking slide channel open end, the opposite end of said locking slide being provided with a planar cam face the plane of which is oriented transversely at an acute angle to the direction of rectilinear sliding movement of said locking slide,
- (c) an operating handle and pivot means pivotally securing said handle to said tool post block for rotation in a plane transverse to the line of movement of said locking slide, a planar cam face on said handle disposed against said locking slide cam face and slidable transversely thereacross in opposite directions when said handle is rotated in opposite directions to thereby respectively drive said locking slide toward said mounting projection receiving recess to lock a tool holder therein and permit retraction of said locking slide from said recess to release the tool holder and permit withdrawal thereof from the tool post block, and means effective to adjust said operating handle cam face and said locking slide cam face to one another to insure surface engagement therebetween when said operating handle is rotated into tool holder locking position.

8. For use with a tool holder having a mounting projection thereon extending laterally of a face of the tool holder, a tool post comprising in combination,
- (a) a tool post block having a recess formed therein opening through at least one face of the block, which recess is sized and shaped to close fittingly slidably receive thereinto the tool holder mounting projection with the face of the tool holder from which extends the mounting projection substantially slidably surface engageable with the said at least one face of the tool post block through which the recess opens, said tool post block also having formed therein a locking slide channel one end of which opens into the recess through a portion of a wall of the block which defines one side surface of the recess,
- (b) a locking slide in said tool post block close fittingly slidably disposed within the said locking slide channel for rectilinear movement therein, one end of said locking slide being proximate to and shiftable through the plane of the channel opening into the mounting projection receiving recess,
- (c) an operating handle and pivot means pivotally securing said handle to said tool post block for rotation in a plane transverse to the line of movement of said locking slide, and
- (d) interengaged camming means associated partly with said operating handle and partly with said locking slide effective to rectilinearly shift said locking slide in its channel toward said mounting projection receiving recess to lock a tool holder therein when said handle is rotated in one sense and effective to permit retraction of said locking slide from said recess to release a tool holder when said handle is rotated in the opposite sense.

9. For use with a tool holder having a mounting projection thereon extending laterally of the body of the tool holder, a tool post comprising in combination,
- (a) a tool post block having a recess formed therein opening through at least one face of the block, which recess is sized and shaped to close fittingly slidably receive thereinto the tool holder mounting projection, said tool post block also having formed therein a locking slide channel extending parallel to the said at least one face of the block with an opening at one end which opens into the said recess through a portion of a wall of the block which defines one surface of the recess,
- (b) a locking slide in said tool post block close fittingly slidably disposed within the said locking slide channel, one end of said locking slide being proximate to and shiftable through the said channel opening into the mounting projection recess,
- (c) an operating handle and pivot means pivotally securing said handle to said tool post block for rotation relative to said block, and
- (d) interengageable camming means associated partly with said operating handle and partly with said locking slide effective to shift said locking slide in its channel toward said mounting projection receiving recess to lock a tool holder therein when said handle is rotated in one sense and effective to permit retraction of said locking slide from said recess to release a tool holder when said handle is rotated in the opposite sense.

10. The tool post apparatus as set forth in claim 9 wherein said pivot means is rigidly fixed to said tool post block with said operating handle disposed thereon and swingable freely thereabout in a substantially fixed plane, and further including
- (a) resilient biasing means engaged with said locking slide effective to constantly urge the latter away from said mounting projection receiving recess and toward said operating handle to thereby maintain said interengageable camming means in engagement, and
- (b) operating handle rotation stop means effective to limit rotation of said operating handle to prevent disengagement of said camming means when said handle is rotated in tool holder releasing direction and thereby maintain said locking slide captive in said tool post block, the full range of operating handle rotation being limited to an acute angle.

11. For use with a tool holder having a mounting projection thereon extending laterally of a face of the tool holder, a tool post comprising in combination,
- (a) a tool post block having a recess formed therein opening through at least one face of the block, which recess is sized and shaped to close fittingly slidably receive thereinto the tool holder mounting projection with the face of the tool holder from which extends the mounting projection substantially slidably surface engageable with the said at least one face of the tool post block through which the recess opens, said tool post block also having formed therein a locking slide channel extending parallel to the said at least one face of the block and one end of which opens into the recess through a portion of a wall of the block which defines one side surface of the recess,
- (b) a locking slide in said tool post block close fittingly slidably disposed within the said locking slide channel for rectilinear movement therein, one end of said locking slide being proximate to and shiftable through the plane of the channel opening into the mounting projection receiving recess,
- (c) an operating handle and pivot means pivotally securing said handle to said tool post block for rotation in a plane transverse to the line of movement of said locking slide, and
- (d) interengaged camming means associated partly with said operating handle and partly with said locking slide effective to rectilinearly shift said locking slide in its channel toward said mounting projection receiving recess to lock a tool holder therein when said handle is rotated in one sense and effective to permit retraction of said locking slide from said recess to release a tool holder when said handle is rotated in the opposite sense.

12. For use with a tool holder having a mounting projection thereon extending laterally of the body of the tool holder, a tool post comprising in combination,
  (a) a tool post block having a recess formed therein opening through at least one face of the block, which recess is sized and shaped to close fittingly slidably receive thereinto the tool holder mounting projection, said tool post block also having formed therein a locking slide channel extending parallel to the said at least one face of the block with an opening at one end which opens into the said recess through a portion of a wall of the block which defines one surface of the recess,
  (b) a locking slide in said tool post block close fittingly slidably disposed within the said locking slide channel, one end of said locking slide being proximate to and shiftable through the said channel opening into the mounting projection recess,
  (c) and selectively operable means operatively coupled to said locking slide to respectively drive said locking slide toward said mounting projection receiving recess to lock a tool holder therein and permit retraction of said locking slide from said recess to release the tool holder and permit withdrawal thereof from the tool post block.

References Cited by the Examiner
UNITED STATES PATENTS

| | | | |
|---|---|---|---|
| 897,625 | 9/1908 | Keel. | |
| 3,107,562 | 10/1963 | Miller | 82—36 |

FOREIGN PATENTS

| | | |
|---|---|---|
| 60,212 | 4/1954 | France. |
| 1,188,372 | 3/1959 | France. |

WILLIAM W. DYER, Jr., *Primary Examiner.*
LEONIDAS VLACHOS, *Examiner.*